United States Patent [19]
Smith

[11] 3,762,191
[45] Oct. 2, 1973

[54] DEVICE FOR LOCKING A CRASH HELMET TO A VEHICLE

[75] Inventor: James P. Smith, Memphis, Tenn.

[73] Assignee: Robert O. Manspeaker, Memphis, Tenn. ; a part interest

[22] Filed: Dec. 28, 1971

[21] Appl. No.: 212,995

[52] U.S. Cl............................ 70/18, 70/59, 224/42, 224/39, 248/361 A
[51] Int. Cl............................................ E05b 69/00
[58] Field of Search ...................... 54/37; 70/14, 15, 70/18, 58, 59, 64, 65, 178, 259, DIG. 58; 211/4; 224/29 D, 42.1 B, 42.39, 42.4, 43, 44; 248/119 R, 203, 361 A

[56] References Cited
UNITED STATES PATENTS

| | | | |
|---|---|---|---|
| 1,607,906 | 11/1926 | Murphy | 54/37 |
| 2,455,237 | 11/1948 | Davis | 248/361 A |
| 1,279,394 | 9/1918 | Mazon et al. | 70/15 |
| 3,170,611 | 2/1965 | Gullen | 224/42.1 B |
| 3,604,671 | 9/1971 | Walker | 248/309 |

FOREIGN PATENTS OR APPLICATIONS 1,440,171  4/1966  France ................................. 224/43

Primary Examiner—Albert G. Craig, Jr.
Attorney—John R. Walker, III

[57] ABSTRACT

A device for lockingly attaching a crash helmet to a two-wheeled vehicle, e.g., a motorcycle. The device includes durable hardened elongated flexble members, e.g., chain segments, suitably assembled and attached one to the other constituting a netlike structure for capturing the helmet by embracing certain portions of the outer surface thereof. In addition, there is flexible elongated holding structure attached to the net and a securing device, e.g., a padlock, interposed between sections of the holding structure for allowing the holding structure to first be suitably directed to circumferentially embrace the appropriate portion of the vehicle, e.g., the saddle, prior to attaching the securing device thereto, thus preventing unwarranted removal of the helmet from the vehicle.

4 Claims, 5 Drawing Figures

PATENTED OCT 2 1973 3,762,191

INVENTOR.
JAMES P. SMITH
BY John R. Walker, III
attorney

DEVICE FOR LOCKING A CRASH HELMET TO A VEHICLE

BACKGROUND OF THE INVENTION

1. Field of the Invention

This invention relates to means for securing a crash helmet to a vehicle.

2. Description of the Prior Art

The background of the invention is well stated in the Locker U.S. Pat. No. 3,436,936. However, the solution to the problem as taught in the No. 3,436,936 U.S. Pat. includes adopting one of several embodied peculiar helmets and/or a peculiar saddle. Obviously, practicing the No. 3,436,936 U.S. Pat. has the disadvantage that manufacturing a peculiar helmet, etc., is rather expensive. Further, the user would be forced to discard his existing helmet in order to equip himself with the locking features of the No. 3,436,936 U.S. Pat., thus adding further expense to the user.

The state of the art as known by the applicant in addition to the above-mentioned patent includes: McOsker et al. U.S. Pat. No. 3,529,451; and the Taylor et al. U.S. Pat. No. 3,531,955. The latter-mentioned patents have an obvious disadvantage in that when the helmet is attached to the vehicle, rain, snow, and dust or other foreign particles may collect in the interior of the helmet which is a source of aggravation to the user.

SUMMARY OF THE INVENTION

The present invention is directed towards overcoming the abovementioned problems. The device of the present invention is intended for lockingly attaching a standard crash helmet to a two-wheeled vehicle, e.g., a motorcycle or the like. The device includes elongated flexible members formed from hardened or high carbon steel, e. g., chain segments or the like, suitably assembled and attached one to the other constituting a netlike structure for capturing the helmet. In other words, the helmet preferably is placed on the saddle of the vehicle with the outside thereof directed upwardly so that the netlike structure may embrace the outer surface thereof. The device also includes an elongated flexible holding member which is suitably attached to the net and a securing device, e.g., a padlock or the like. The padlock may be positioned so as to engage the netlike structure and the opposite end of the holding member or the holding member may comprise two pieces so that the padlock is interposed between the holding structure for allowing the holding structure to first be suitably directed to circumferentially embrace the appropriate portion of the vehicle prior to attaching the padlock thereto, thus preventing unwarranted removal of the helmet from the vehicle. It should be understood that the helmet may be placed on other portions of the vehicle, e. g., the gas tank or the front fender, etc., and the holding structure suitably directed thereabout in like manner as above-described for securing the helmet thereto.

DESCRIPTION OF THE PREFERRED EMBODIMENT

Figure 1:
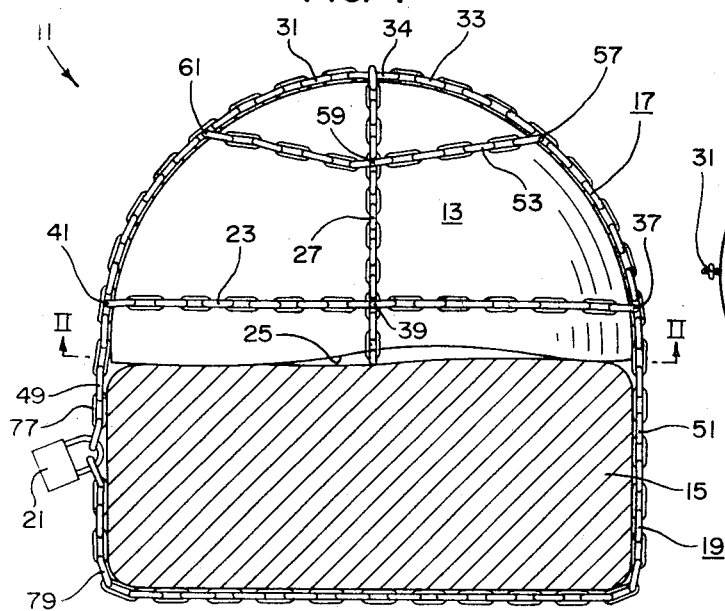
FIG. 1 is a front elevational view of the locking device of the present invention showing a standard crash helmet being captured by the device while resting on a saddle of a two-wheeled vehicle, the saddle being shown in cross section and the locking device circumferentially embracing the saddle.

The locking device 11 of the present invention is intended for lockingly attaching a crash helmet 13 to a portion, e.g., a saddle 15 of a two-wheeled vehicle, e.g., a motorcycle or the like. The locking device 11 of the present invention generally comprises a net structure 17 for capturing the crash helmet 13 by embracing the spherical outer surface thereof. Additionally, there is provided an elongated flexible holding structure 19, which is attached to the net structure 17, and securing structure, e.g., a padlock 21 or the like, for lockingly joining the holding structure 19 to the net structure 17, thus preventing unwarranted removal of the helmet 13 from the vehicle. In other words, the holding structure 19 is suitably directed to circumferentially embrace the saddle 15 prior to attaching the padlock 21 thereto.

More specifically, the net structure 17, being formed from very hard flexible steel, e.g., high carbon steel chain or the like, comprises a circular disposed elongated flexible member 23 for embracing the helmet 13 adjacent the rim portion 25 thereof. The net structure 17 also includes a first pair of flexible chain segments 27, 29 and a second pair of flexible chain segments 31, 33.

Figure 3:
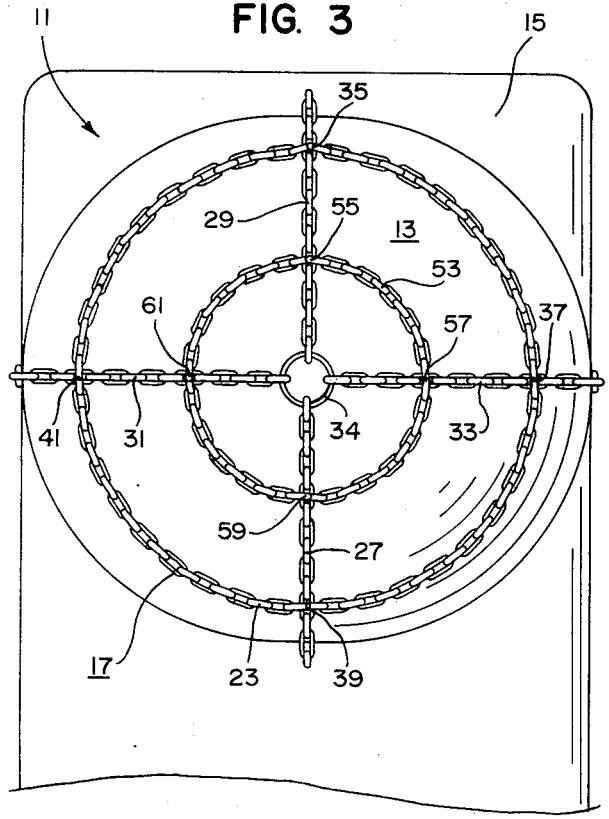
FIG. 3 is a top view of the locking device of the present invention as shown in FIG. 1.

Each of the chain segments 27, 29, 31 and 33 converge centrally of the circular member 23 and are suitably joined one to the other by a high carbon steel ring 34, or the like. Thus, one of the respective ends thereof are fixedly attached one to the other as best illustrated in FIG. 3 of the drawings. The first and second pairs of chain segments 27, 29; 31, 33 respectively extend from the central convergency to the rim 25 of the helmet 13 establishing a plurality of intersection points 35, 37, 39, 41 with the circular member 23. The segments 27, 29, 31, 33 are attached to the circular member 23 at the intersection points 35, 37, 39 and 41, respectively.

From FIG. 3 of the drawings, it may be seen that the first pair of chain segments 27, 29 are positioned substantially 180° one from the other and the second pair of chain segments 31, 33 are likewise positioned substantially 180° one from the other. The first pair of chain segments 27, 29 respectively have first extension flexible chain segments 43, 45 attached thereto, as best illustrated in FIG. 2.

Figure 2:
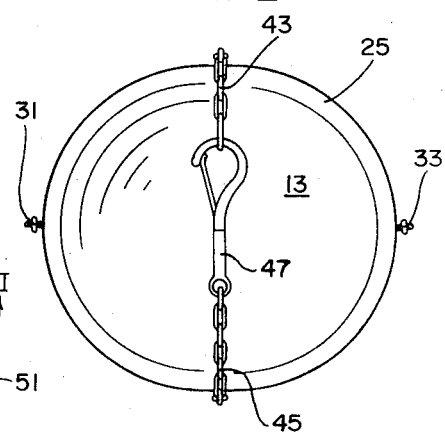
FIG. 2 is a sectional view taken as on the line II—II of FIG. 1.

The net structure 17 additionally includes a means for removably joining the first extension segments 43, 45, e.g., a clasp 47 which is attached to the extension segment 45 for removable clasping to the extension 43 as best illustrated in FIG. 2 of the drawings.

Figure 4:
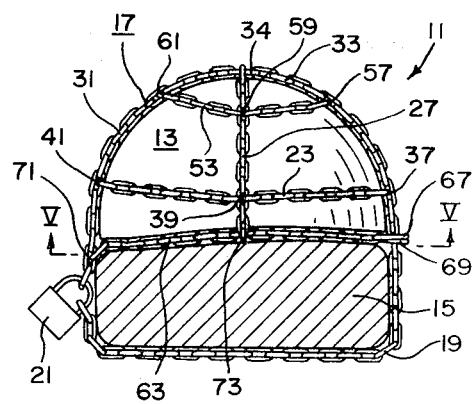
FIG. 4 is a view similar to FIG. 1 depicting an alternate embodiment of certain holding structure thereof.

From FIG. 4 of the drawings, it may be seen that the holding structure 19 constitutes an extension to the flexible chain segment 33. Further, the lock 21 joins one end of the holding structure 19 to the lower end of the flexible chain segment 31. However, it should be understood that the flexible holding structure 19 may optionally include second extension segments 49, 51 respectively for the second pair of flexible chain segments 31, 33, as best illustrated in FIG. 1 of the drawings.

The second extension segments 49, 51 have a predetermined length thereto so that the ends thereof will at least meet one another when brought together. In other words, the helmet 13 is captured by the net structure 17, and is resting on the saddle 15 or another portion of the vehicle, e.g., the gas tank (not shown) or the front fender or the like, and the second extensions 49, 51 are circumferentially embracing the appropriate portion of the vehicle.

The net structure 17 preferably includes a second circular disposed elongated flexible member 53 for embracing the helmet 13 adjacent the upper portion thereof. Additionally, the first and second pairs of chain segments 27, 29; 31, 33 intersect the second circular member 53 establishing intersection points 55, 57, 59, 61 and are fixedly attached thereto at these intersection points.

Figure 5:
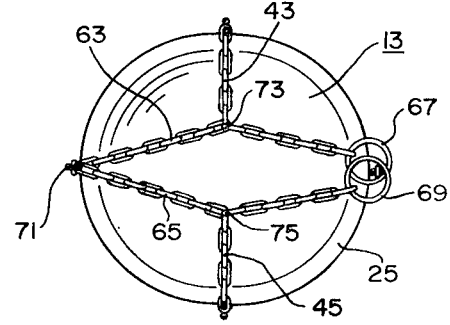
FIG. 5 is a sectional view taken as on the line V—V of FIG. 4.

Particular attention is now directed towards FIGS. 4 and 5 of the drawings wherein it may be seen that an alternate embodiment for the means for removably joining the first extension segments 43, 45 includes a pair of elongated flexible segment joining members 63, 65 and a pair of ring members 67, 69. One of the ends of each of the joining members 63, 65 is attached to the lower end of the flexible segment 31 at a point identified by the numeral 71 and the respective opposite ends thereof are attached to the ring members 67, 69. The respective lower ends of the first extension segments 43, 45 are attached to the joining members 63, 65 intermediate the length of the joining members 63, 65, i.e., at the points identified by the numerals 73, 75. The extension chain segment 51, or the elongated flexible holding structure 19, is received in the ring members 67, 69 as the pair of extension segments 49, 51 circumferentially embrace the portion, e.g., the saddle 15, etc., of the vehicle.

The locking device 11 is placed into operation by causing the net 17 to capture the helmet 13 substantially as shown in the drawings. This includes joining the first extension chain segments 43, 45 by the appropriate means above-described. In other words, when the device 11 constitutes the principal embodiment thereof, the clasp 47 is attached to the end of the segment 43 as previously disclosed. On the other hand, when the device 11 constitutes the second embodiment thereof, the second extension chain segment 51 is simply inserted through the rings 67, 69.

The locking device 11 and the helmet 13 are then placed on the portion, e.g., the saddle 15, of the vehicle so that the weather-proof outer surface of the helmet 13 is directed upwardly as depicted in FIGS. 1 and 3 of the drawings. Then, the extension chain segment 51 is suitably directed about the structure of the vehicle so as to circumferentially embrace the appropriate portion, e.g., the saddle 15 of the vehicle. The free ends of the second extension chain segments 49, 51 are brought together and the securing means, e.g., the padlock 21 or the like, is caused to engage the segments 49, 51 and the securing means is locked, thus preventing unwarranted removal of the helmet 13 from the vehicle. It should be understood that the length of the segments 49, 51 may be greater than that depicted in the drawing, accordingly, the segments 49, 51 are overlapped sufficiently to assure snug contiguous engagement of the rim 25 of the helmet 13 with the saddle 15, i.e., the lock 21 engaging intermediate links of the segments 49, 51, e.g., links 77, 79.

It should be understood that when the locking device 11 is suitably placed on the vehicle as above-disclosed, access to the clasp 47 for removing it from the segment 43 is not possible.

Although the invention has been described and illustrated with respect to a preferred embodiment thereof, it is not to be so limited since changes and modifications may be made therein which are within the full intended scope of the invention.

I claim:

1. The combination with a portion of a vehicle of locking means for a crash helmet, said locking means comprising a circular disposed elongated flexible member for embracing said helmet adjacent the rim thereof, first and second pairs of flexible segments converging centrally of said circular member and one of the respective ends thereof being fixedly attached one to the other, said segments respectively extending from said central convergency to the rim of said helmet establishing intersection points with said circular member, said segments respectively being attached to said circular member at said intersection points, said first pair of flexible segments being positioned substantially 180° one from the other and said second pair of flexible segments being positioned substantially 180° one from the other, said first pair of flexible segments respectively having first extension segments attached thereto, means for removably joining said first extension segments, said second pair of flexible segments respectively having second extension segments attached thereto, said second extension segments having a predetermined length for meeting one another when brought together by resting the helmet on said portion of said vehicle and with said second extensions circumferentially embracing said portion of said vehicle, and securing means for locking the ends of said second extension segments one to the other for preventing unwarranted removal of the helmet from the vehicle.

2. The combination of claim 1 in which is included a second circular disposed elongated flexible member for embracing said helmet adjacent the upper portion thereof, said first and second pairs of flexible segments intersecting said second circular member and being fixedly attached thereto at said intersection points.

3. The combination of claim 2 in which said means for removably joining said first extension segments includes clasp means attached to one of said first extension segments for removable clasping to the other of said first extension segments.

4. The combination of claim 2 in which said means for removably joining said first extension segments includes a pair of elongated flexible segment joining members, a pair of ring means, one of the ends of each of said joining members being attached to the lower end of one of said second pair of flexible segments and the other ends thereof respectively being fixedly attached to said ring means, the respective lower ends of said first extension segments being attached to said joining members intermediate the lengths of the joining members, and one of said second extension segments being received in said pair of ring means as said pair of second extension segments circumferentially embraces said portion of said vehicle.

* * * * *